(12) United States Patent
Kaushik et al.

(10) Patent No.: US 9,088,894 B1
(45) Date of Patent: Jul. 21, 2015

(54) SYSTEMS AND METHODS FOR DETECTING ROGUE CLIENT DEVICES CONNECTED TO WIRELESS HOTSPOTS

(71) Applicant: Juniper Networks, Inc., Sunnyvale, CA (US)

(72) Inventors: Anil Kaushik, Bangalore (IN); Stephen Grau, Pleasanton, CA (US); Sainath Reddy Cheruvu, Puttaparthi (IN); Sreenivas Voruganti, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 9 days.

(21) Appl. No.: 14/037,343

(22) Filed: Sep. 25, 2013

(51) Int. Cl.
*H04L 29/06* (2006.01)
*H04W 12/06* (2009.01)

(52) U.S. Cl.
CPC ..................... *H04W 12/06* (2013.01)

(58) Field of Classification Search
CPC ............................... H04W 12/06; H04L 63/08
USPC ............................................................ 726/3
See application file for complete search history.

(56) References Cited

U.S. PATENT DOCUMENTS

| | | | | |
|---|---|---|---|---|
| 7,295,524 | B1 * | 11/2007 | Gray et al. | 370/254 |
| 7,336,670 | B1 * | 2/2008 | Calhoun et al. | 370/401 |
| 7,813,354 | B1 * | 10/2010 | Norris | 370/401 |
| 8,132,234 | B2 * | 3/2012 | Yao | 726/3 |
| 8,694,624 | B2 * | 4/2014 | Sinha et al. | 709/224 |
| 8,893,246 | B2 * | 11/2014 | Jover Segura et al. | 726/7 |
| 2005/0030929 | A1 * | 2/2005 | Swier et al. | 370/338 |
| 2006/0068811 | A1 * | 3/2006 | Adya et al. | 455/456.2 |
| 2006/0085543 | A1 * | 4/2006 | Hrastar et al. | 709/224 |
| 2009/0222920 | A1 * | 9/2009 | Chow et al. | 726/23 |
| 2009/0235354 | A1 * | 9/2009 | Gray et al. | 726/22 |
| 2012/0331544 | A1 * | 12/2012 | Bostrom et al. | 726/13 |
| 2014/0282905 | A1 * | 9/2014 | Iyer et al. | 726/4 |
| 2014/0325615 | A1 * | 10/2014 | Scahill et al. | 726/4 |

OTHER PUBLICATIONS

Enhancing the Security of Corporate Wi-Fi Networks Using DAIR|http://www.researchgate.net/publication/221234598_Enhancing_the_security_of_corporate_Wi-Fi_ntworks_using_DAIR|Bahl et al.|Jun. 19, 2006|pp. 1-14.*

* cited by examiner

*Primary Examiner* — Mahfuzur Rahman
(74) *Attorney, Agent, or Firm* — ALG Intellectual Property, LLC

(57) ABSTRACT

A computer-implemented method for detecting rogue client devices connected to wireless hotspots may include maintaining at least one illegitimate authentication identifier that appears to rogue client devices to facilitate authentication with an external network via a wireless hotspot. The method may also include providing the illegitimate authentication identifier to one or more client devices connected to the wireless hotspot. The method may further include receiving an authentication request to authenticate the client device with at least one external network via the wireless hotspot. The method may additionally include determining that the authentication request includes the illegitimate authentication identifier. Finally, the method may include determining that the client device is a rogue device based at least in part on the illegitimate authentication identifier being included in the authentication request. Various other methods, systems, and computer-readable media are also disclosed.

18 Claims, 7 Drawing Sheets

SYSTEMS AND METHODS FOR DETECTING ROGUE CLIENT DEVICES CONNECTED TO WIRELESS HOTSPOTS

BACKGROUND

Many Internet Service Providers (ISPs) are experiencing daily increases in the amount of network traffic passing through their data networks. Unfortunately, due to certain infrastructural limitations, some ISPs may be unable to accommodate these increases in network traffic without assistance from additional resources (such as wireless hotspots). As a result, some ISPs may establish roaming agreements with wireless hotspots that provide access to the Internet using Wireless Local Area Network (WLAN) technologies. Through these roaming agreements, the ISPs may offload a portion of the network traffic from their data networks to wireless hotspots to help accommodate these increases in network traffic.

While traditional wireless hotspots may enable ISPs to offload a portion of network traffic, such hotspots may still be unable to properly distinguish between legitimate client devices associated with the ISPs and rogue client devices that are not associated with the ISPs. For example, a rogue client device that does not subscribe to any of the ISPs supported by a traditional wireless hotspot may obtain a list of authentication identifiers (e.g., Organizationally Unique Identifiers (OUIs) and/or realm codes) from an access point of the wireless hotspot. This rogue client device may then request that the access point authenticate the device with one of the ISPs supported by the wireless hotspot based on an authentication identifier corresponding to that ISP.

Unfortunately, by requesting such authentication, the rogue client device may cause the access point to consume some of the hotspot's resources and/or degrade the hotspot's performance. Additionally or alternatively, the rogue client device may gain illegitimate access to the Internet by hacking the wireless hotspot. The instant disclosure, therefore, identifies and addresses a need for systems and methods for detecting rogue client devices connected to wireless hotspots.

SUMMARY

As will be described in greater detail below, the instant disclosure generally relates to systems and methods for detecting rogue client devices connected to wireless hotspots.

In one example, a computer-implemented method for detecting rogue client devices connected to wireless hotspots may include maintaining at least one illegitimate authentication identifier that appears to rogue client devices to facilitate authentication with an external network via a wireless hotspot. The method may also include providing the illegitimate authentication identifier to one or more client devices connected to the wireless hotspot. The method may further include receiving an authentication request to authenticate the client device with at least one external network via the wireless hotspot. The method may additionally include determining that the authentication request includes the illegitimate authentication identifier. Finally, the method may include determining that the client device is a rogue device based at least in part on the illegitimate authentication identifier being included in the authentication request.

As another example, a system for detecting rogue client devices connected to wireless hotspots may include a maintenance module that maintains at least one illegitimate authentication identifier that appears to rogue client devices to facilitate authentication with an external network via the wireless hotspot. The system may also include a provisioning module that provides the illegitimate authentication identifier to one or more client devices connected to the wireless hotspot. The system may further include a reception module that receives an authentication request to authenticate the client device with at least one external network via the wireless hotspot. The system may additionally include a determination module that determines that the authentication request includes the illegitimate authentication identifier. The determination module may also determine that the client device is a rogue device based at least in part on the illegitimate authentication identifier being included in the authentication request. Finally, the system may include at least one processor configured to execute the maintenance module, the provisioning module, the reception module, and the determination module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to maintain at least one illegitimate authentication identifier that appears to rogue client devices to facilitate authentication with an external network via a wireless hotspot. The computer-executable instructions may also cause the computing device to provide the illegitimate authentication identifier to one or more client devices connected to the wireless hotspot. The computer-executable instructions may further cause the computing device to receive an authentication request to authenticate the client device with at least one external network via the wireless hotspot. The computer-executable instructions may additionally cause the computing device to determine that the authentication request includes the illegitimate authentication identifier. Finally, the computer-executable instructions may cause the computing device to determine that the client device is a rogue device based at least in part on the illegitimate authentication identifier being included in the authentication request.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
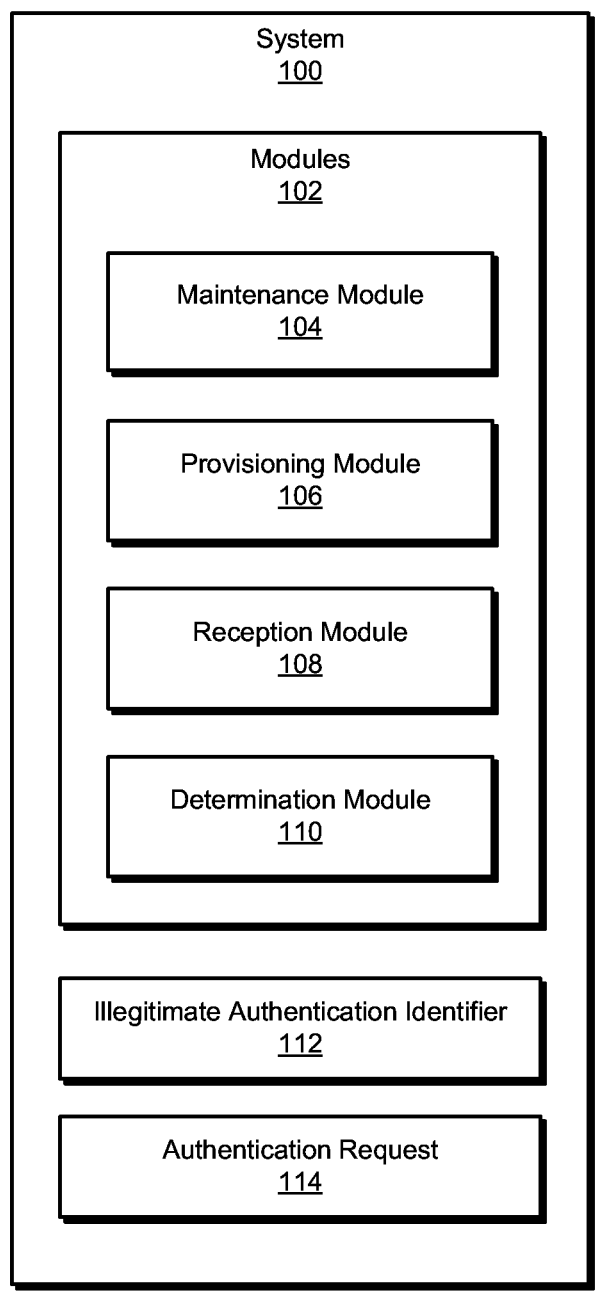
FIG. 1 is a block diagram of an exemplary system for detecting rogue client devices connected to wireless hotspots.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting rogue client devices connected to wireless hotspots. As will be explained in greater detail below, by randomly generating illegitimate authentication identifiers and providing these illegitimate authentication identifiers to client devices connected to a wireless hotspot, the various systems and methods described herein may coax rogue client devices into issuing authentication requests that include at least one of these illegitimate authentication identifiers. Moreover, by tricking rogue client devices into issuing such authentication requests, the various systems and methods described herein may be able to detect the rogue client devices by determining that the authentication requests issued by the rogue client devices include at least one of the randomly generated illegitimate authentication identifiers.

Figure 2:
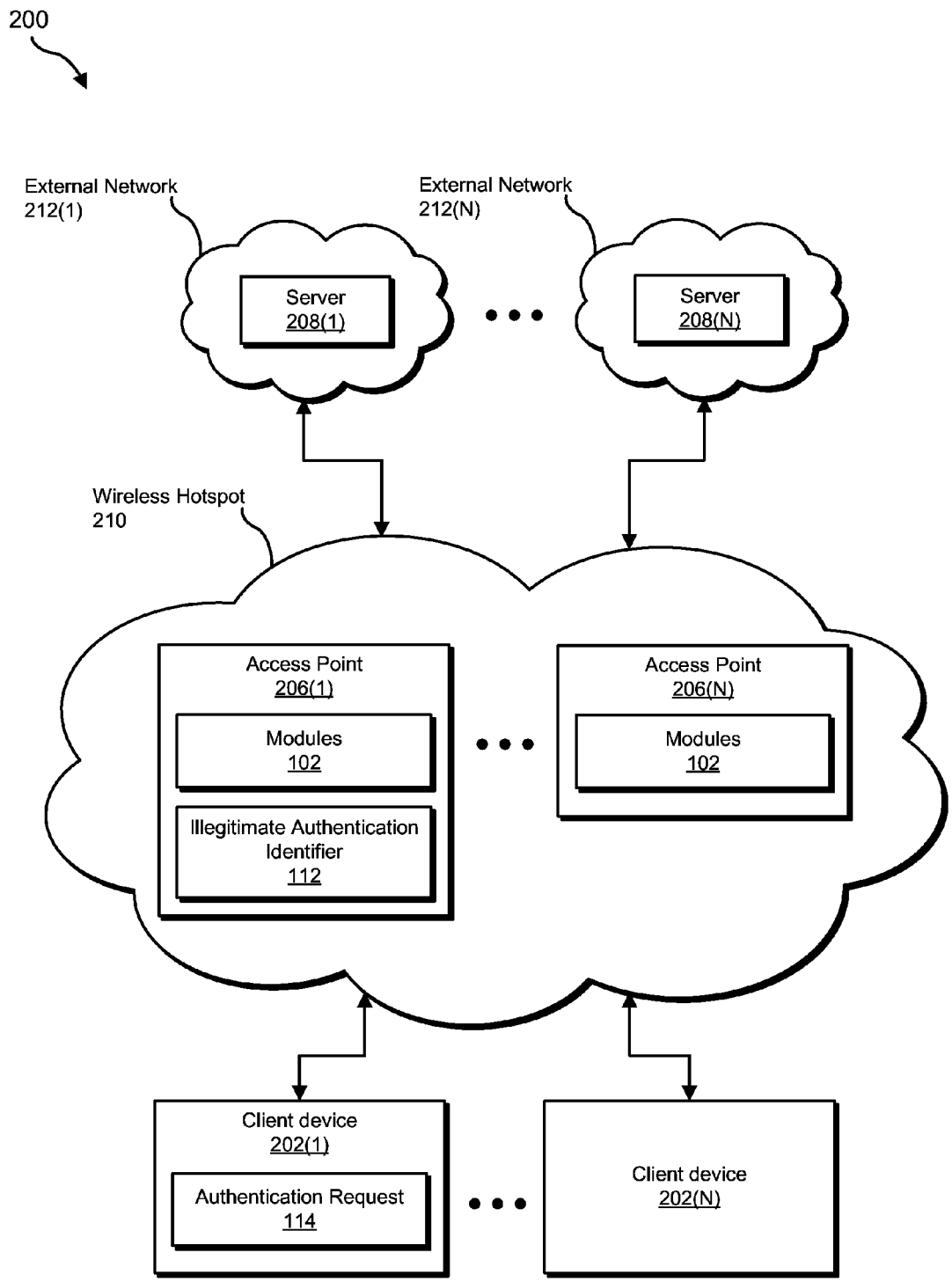
FIG. 2 is a block diagram of another exemplary system for detecting rogue client devices connected to wireless hotspots.

The following will provide, with reference to FIGS. 1-2, detailed descriptions of exemplary systems for detecting rogue client devices connected to wireless hotspots. Detailed descriptions of corresponding computer-implemented methods will be provided in connection with FIG. 3. Detailed descriptions of exemplary illegitimate authentication identifiers will be provided in connection with FIG. 4. Detailed descriptions of an exemplary query for authentication identifiers and an exemplary authentication request will be provided in connection with FIG. 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for detecting rogue client devices connected to wireless hotspots. As illustrated in this figure, exemplary system 100 may include one or more modules 102 for performing one or more tasks. For example, and as will be explained in greater detail below, exemplary system 100 may include a maintenance module 104 that maintains at least one illegitimate authentication identifier that appears to rogue devices to facilitate authentication with an external network via the wireless hotspot. Exemplary system 100 may also include a provisioning module 106 that provides the illegitimate authentication identifier to one or more client devices connected to the wireless hotspot.

In addition, and as will be described in greater detail below, exemplary system 100 may include a reception module 108 that receives an authentication request to authenticate the client device with at least one external network via the wireless hotspot. Exemplary system 100 may further include a determination module 110 that determines that the authentication request includes the illegitimate authentication identifier and then determines that the client device is a rogue device based at least in part on the illegitimate authentication identifier being included in the authentication request. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., access points 206(1)-(N)), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more illegitimate authentication identifiers, such as illegitimate authentication identifier 112. The phrase "illegitimate authentication identifier," as used herein, generally refers to any type or form of randomly generated and/or fake identifier that appears to rogue client devices to facilitate authentication with an external network via a wireless hotspot. An illegitimate authentication identifier may be configured to look like a legitimate identifier while actually being fake (i.e., incapable of facilitating authentication with an external network). Examples of illegitimate authentication identifier 112 include, without limitation, randomly generated and/or fake OUIs, randomly generated and/or fake realm codes or names, randomly generated and/or fake Network Access Identifiers (NAIs), combinations of one or more of the same, or any other type of authentication identifier that is designed to catch rogue devices that are not authorized to use a wireless hotspot and therefore cannot tell the difference between real and fake authentication identifiers.

As illustrated in FIG. 1, exemplary system 100 may also include one or more authentication requests, such as authentication request 114. The phrase "authentication request," as used herein, generally refers to any type or form of request that initiates the process of authenticating a client device with an external network via a wireless hotspot. In one example, authentication request 114 may include illegitimate authentication identifier 112.

Exemplary system 100 in FIG. 1 may be implemented in a variety of ways. For example, all or a portion of exemplary system 100 may represent portions of exemplary system 200 in FIG. 2. As shown in FIG. 2, system 200 may include a wireless hotspot 210 in communication with one or more client devices 202(1)-(N) and/or one or more external networks 212(1)-(N). Wireless hotspot 210 may include one or more access points 206(1)-(N). Access points 206(1)-(N) may each be programmed with one or more of modules 102. Additionally or alternatively, one or more of access points 206(1)-(N) may generate, store, and/or maintain illegitimate authentication identifier 112.

As shown in FIG. 2, one or more of client devices 202(1)-(N) may include and/or issue authentication request 114. Moreover, external network 212(1) may include server 208(1). External network 212(N) may include server 208(N).

In one embodiment, one or more of modules 102 from FIG. 1 may, when executed by at least one processor of access points 206(1)-(N), cause at least one of access points 206(1)-(N) to detect rogue client devices. For example, and as will be described in greater detail below, maintenance module 104 may cause access point 206(1) to maintain illegitimate authentication identifier 112 that appears to rogue client devices to facilitate authentication with at least one of external networks 212(1)-(N) via wireless hotspot 210. Provisioning module 106 may cause access point 206(1) to provide illegitimate authentication identifier 112 to one or more of client devices 202(1)-(N) connected to wireless hotspot 210. Reception module 108 may cause access point 206(1) to receive authentication request 114 from client device 202(1) to authenticate client device 202(1) with at least one of external networks 212(1)-(N) via wireless hotspot 210. Determination module 110 may cause access point 206(1) to determine that authentication request 114 includes illegitimate authentication identifier 112 and then determine that client device 202(1) is a rogue device based at least in part on illegitimate authentication identifier 112 being included in authentication request 114.

Client devices 202(1)-(N) generally represent any type or form of computing device capable of reading computer-executable instructions. Examples of client devices 202(1)-(N) include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing devices.

Wireless hotspot 210 generally represents any type or form of geographic area and/or site where Internet access is provided to one or more client devices via Wi-Fi technology. Examples of wireless hotspot 210 include, without limitation, a geographic area and/or site that includes a WLAN, a Wireless Fidelity (Wi-Fi) network, a Wide Area Network (WAN), a Wireless Wide Area Network (WWAN), a Local Area Network (LAN), a Personal Area Network (PAN), a cellular network (e.g., a Global System for Mobile Communications (GSM) network), exemplary network architecture 700 in FIG. 7, a combination of one or more of the same, or any other suitable network that facilitates communication and/or data transfer. Wireless hotspot 210 may facilitate communication and/or data transfer using wireless and/or wired connections. In one embodiment, wireless hotspot 210 may facilitate communication between one or more of client devices 202(1)-(N) and a network (such as the Internet).

Access points 206(1)-(N) generally represent any type or form of computing device and/or application capable of using Wi-Fi technology to facilitate communication and/or data transfer between one or more client devices and the Internet. Examples of access points 206(1)-(N) include, without limitation, wireless routers, WLAN controllers, switches, network hubs, gateways, bridges, Wi-Fi nodes, combinations of one or more of the same, or any other suitable access points.

External networks 212(1)-(N) generally represent any type or form of medium or architecture capable of facilitating communication and/or data transfer with one or more client devices via a wireless hotspot. In some examples, external networks 212(1)-(N) may each represent an ISP's data network and/or a cellular data network. Examples of external networks 212(1)-(N) include, without limitation, GSM networks, General Packet Radio Service (GPRS) networks, Code Division Multiple Access (CDMA) networks, EVolution-Data Optimized (EV-DO) networks, Enhanced Data Rates for GSM Evolution (EDGE) networks, Universal Mobile Telecommunications System (UMTS) networks, Digital Enhanced Cordless Telecommunications (DECT) networks, combinations of one or more of the same, or any other suitable external networks.

Servers 208(1)-(N) generally represents any type or form of computing device capable of authenticating a client device with a network and/or ISP. Examples of servers 208(1)-(N) include, without limitation, application servers, web servers, storage servers, authentication servers, and/or database servers configured to run certain software applications and/or provide various web, storage, authentication, and/or database services.

Figure 3:
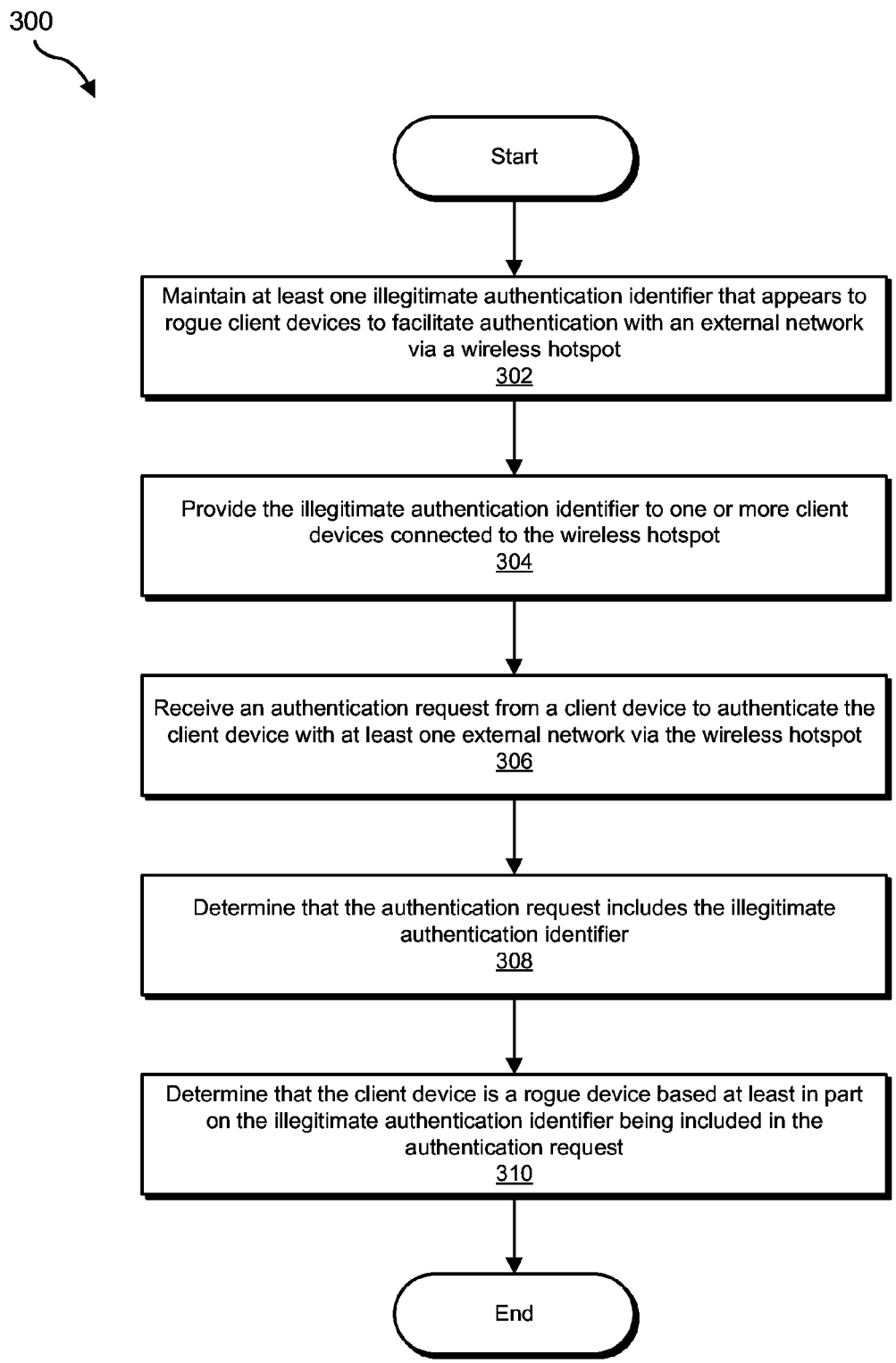
FIG. 3 is a flow diagram of an exemplary method for detecting rogue client devices connected to wireless hotspots.

FIG. 3 is a flow diagram of an exemplary computer-implemented method 300 for detecting rogue client devices connected to wireless hotspots. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may maintain at least one illegitimate authentication identifier that appears to rogue client devices to facilitate authentication with an external network via a wireless hotspot. For example, at step 302 maintenance module 104 may, as part of access point 206(1) in FIG. 2, maintain illegitimate authentication identifier 112. In this example, illegitimate authentication identifier 112 may appear to rogue client devices to facilitate authentication with an external network via wireless hotspot 210. However, illegitimate authentication identifier 112 may be unable to actually facilitate authentication with any of external networks 212(1)-(N) via wireless hotspot 210.

The phrases "rogue client device" and "rogue device," as used herein, generally refer to any type or form of computing device that attempts to use and/or access a wireless hotspot without legitimate authorization. In one example, a rogue client device may attempt to access the Internet via wireless hotspot 210 without legitimate authorization. Additionally or alternatively, the rogue client device may attempt to launch an attack that disrupts and/or impairs the Internet access provided by wireless hotspot 210.

Figure 4:
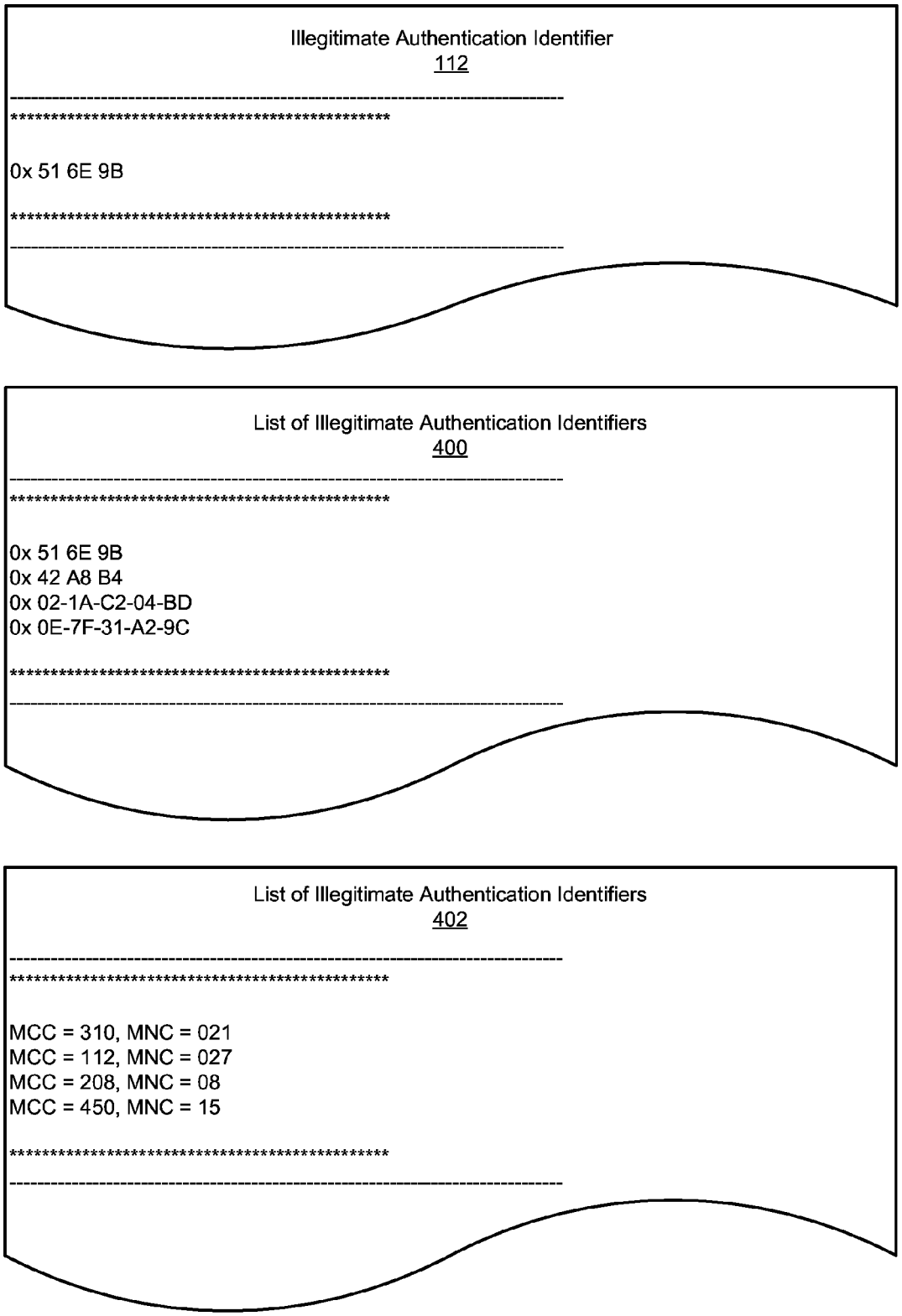
FIG. 4 is an illustration of exemplary illegitimate authentication identifiers used to detect rogue client devices connected to wireless hotspots.

The systems described herein may perform step 302 in a variety of ways. In some examples, maintenance module 104 may randomly generate illegitimate authentication identifier 112 to facilitate detecting rogue client devices connected to wireless hotspot 210. As shown in FIG. 4, illegitimate authentication identifier 112 may include an OUI (in this example, "0x 51 6E 9B") that appears to rogue client devices to facilitate authentication with an external network supported by wireless hotspot 210. However, this "0x 51 6E 9B" OUI may neither correspond to any of external networks 212(1)-(N) nor facilitate authentication with any of external networks 212(1)-(N).

Figure 5:
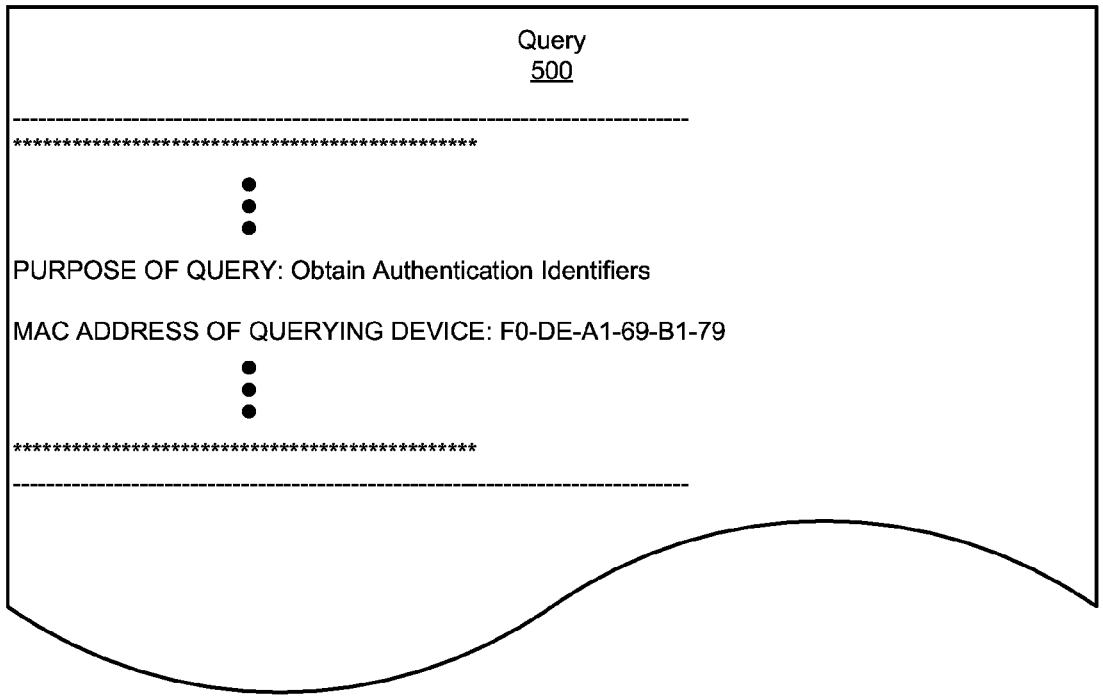
FIG. 5 is an illustration of an exemplary query for authentication identifiers and an exemplary authentication request.
Figure 5:
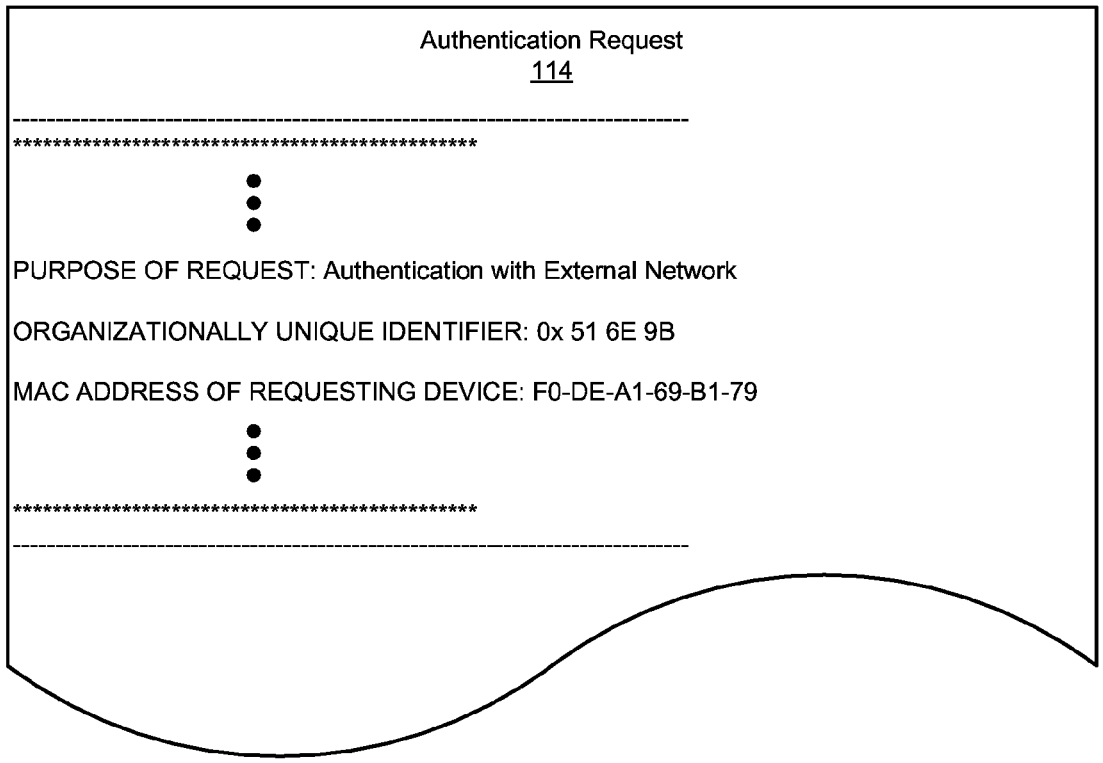

In some examples, maintenance module 104 may generate illegitimate authentication identifier 112 in advance or on an "as-needed" basis. In one example, reception module 108 may, as part of access point 206(1) in FIG. 2, receive a query 500 in FIG. 5 from client device 202(1) for one or more authentication identifiers that facilitate authentication with at least one external network via wireless hotspot 210. As shown in FIG. 5, query 500 may identify the purpose of the query (in this example, "Obtain Authentication Identifiers") and/or the Media Access Control (MAC) address of the querying device (in this example, "F0-DE-A1-69-B1-79"). Examples of query 500 include, without limitation, Generic Advertisement Service (GAS) queries, Access Network Query Protocol (ANQP) queries, Wi-Fi queries, combinations of one or more of the same, or any other suitable query.

After reception module 108 has received query 500, determination module 110 may, as part of access point 206(1), identify the MAC address of the querying device in query 500. For example, determination module 110 may identify the "F0-DE-A1-69-B1-79" MAC address in query 500 received from client device 202(1). Determination module 110 may then determine that the "F0-DE-A1-69-B1-79" MAC address identified in query 500 corresponds to client device 202(1).

Upon determining that the "F0-DE-A1-69-B1-79" MAC address corresponds to client device 202(1), determination module 110 may determine whether wireless hotspot 210 has previously encountered client device 202(1). For example, determination module 110 may compare the "F0-DE-A1-69-B1-79" MAC address of client device 202(1) with a list of MAC addresses corresponding to client devices previously encountered by at least one of access points 206(1)-(N). In this example, determination module 110 may determine that wireless hotspot 210 has not previously encountered client device 202(1) based at least in part on this comparison.

In response to this determination that wireless hotspot 210 has not previously encountered client device 202(1), maintenance module 104 may randomly generate illegitimate authentication identifier 112 to facilitate determining whether client device 202(1) is a rogue device that is not authorized to use wireless hotspot 210. For example, maintenance module 104 may maintain legitimate authentication identifiers that facilitate authenticating client devices with external networks 212(1)-(N) supported by wireless hotspot 210. In this example, maintenance module 104 may randomly generate illegitimate authentication identifier 112 and ensure that illegitimate authentication identifier 112 is sufficiently distinct from each of the legitimate authentication identifiers.

In some examples, maintenance module 104 may generate illegitimate authentication identifier 112 in response to at least one trigger associated with wireless hotspot 210. The term "trigger," as used herein, generally refers to any type or form of metric, measurement, value, characteristic, and/or attribute of a wireless hotspot and/or access point. Examples of this trigger associated with wireless hotspot 210 include, without limitation, a specific number of queries received by at least one of access points 206(1)-(N), a specific number of authentication requests received by at least one of access points 206(1)-(N), a specific number of client devices that have been successfully authenticated with a specific external network via at least one of access points 206(1)-(N), a specific number of failed authentication requests received by at least one of access points 206(1)-(N), a combination of one or more of the same, or any other suitable trigger.

In one example, determination module 110 may determine that at least one trigger associated with wireless hotspot 210 exceeds a predetermined threshold. In response to the determination that the trigger associated with wireless hotspot 210 exceeds the predetermined threshold, maintenance module 104 may randomly generate illegitimate authentication identifier 112 to facilitate determining whether client device 202(1) is a rogue device that is not authorized to use wireless hotspot 210.

In some examples, maintenance module 104 may obtain illegitimate authentication identifier 112 from an external source. For example, maintenance module 104 may obtain a preexisting illegitimate authentication identifier 112 from client device 202(N). Additionally or alternatively, maintenance module 104 may obtain a preexisting illegitimate authentication identifier 112 from an Internet resource (such as a remote security server).

In some examples, maintenance module 104 may generate, store, and/or maintain a list of illegitimate OUIs as a list of illegitimate authentication identifiers 400. As shown in FIG. 4, list of illegitimate authentication identifiers 400 may include a plurality of OUIs (in this example, "0x 51 6E 9B," "0x 42 A8 B4," "0x 02-1A-C2-04-BD," and "0x 0E-7F-31-A2-9C") that appear to rogue client devices to facilitate authentication with one or more external networks supported by wireless hotspot 210. However, the "0x 51 6E 9B," "0x 42 A8 B4," "0x 02-1A-C2-04-BD," and "0x 0E-7F-31-A2-9C" OUIs included in list 400 may neither correspond to any of external networks 212(1)-(N) nor facilitate authentication with any of external networks 212(1)-(N).

Additionally or alternatively, maintenance module 104 may generate, store, and/or maintain a list of illegitimate realm codes as a list of illegitimate authentication identifiers 402. For example, list of illegitimate authentication identifiers 402 may include pairings of Mobile Country Codes (MCCs) and Mobile Network Codes (MNCs). The term "MCC," as used herein, generally refers to any type or form of code that represents a specific country in which an ISP provides access to the Internet. The term "MNC," as used herein, generally refers to any type or form of code that uniquely identifies an ISP that provides access to the Internet in the specific country identified by the corresponding MCC. At least one of the MCC and the MNC may be illegitimate in each pairing included in list 402.

As shown in FIG. 4, list of illegitimate authentication identifiers 402 may include a plurality of realm codes (in this example, "MCC=310, MNC=021," "MCC=112, MNC=027," "MCC=208, MNC=08," and "MCC=450, MNC=15") that appear to rogue client devices to facilitate authentication with one or more external networks supported by wireless hotspot 210. However, the "MCC=310, MNC=021," "MCC=112, MNC=027," "MCC=208, MNC=08," and "MCC=450, MNC=15" realm codes included in list 402 may neither correspond to any of external networks 212(1)-(N) nor facilitate authentication with any of external networks 212(1)-(N).

Returning to FIG. 3, at step 304 one or more of the systems described herein may provide the illegitimate authentication identifier to one or more client devices connected to the wireless hotspot. For example, at step 304 provisioning module 106 may, as part of access point 206(1) in FIG. 2, provide illegitimate authentication identifier 112 to one or more of client devices 202(1)-(N) connected to wireless hotspot 210. By providing illegitimate authentication identifier 112 to client devices 202(1)-(N), provisioning module 106 may help coax any rogue devices within client devices 202(1)-(N) into exposing themselves as unauthorized devices by issuing an authentication request that includes illegitimate authentication identifier 112.

The systems described herein may perform step 304 in a variety of ways. In some examples, provisioning module 106 may provide illegitimate authentication identifier 112 to client device 202(1) in response to query 500. For example, provisioning module 106 may direct access point 206(1) to transmit a wireless communication that includes illegitimate authentication identifier 112 to client device 202(1) in response to query 500.

In some examples, provisioning module 106 may provide list of illegitimate authentication identifiers 400 and/or list of authentication identifiers 402 to client device 202(1) in response to query 500. For example, provisioning module

106 may direct access point 206(1) to transmit a wireless communication that includes list 400 and/or list 402 to client device 202(1) in response to query 500.

In some examples, provisioning module 106 may provide a list that includes both legitimate and illegitimate authentication identifiers to client device 202(1). For example, provisioning module 106 may compile a list that includes illegitimate authentication identifier 112 and one or more legitimate authentication identifiers that facilitate authentication with one or more of external networks 212(1)-(N). Upon compiling this list, provisioning module 106 may direct access point 206(1) to transmit a wireless communication that includes the list to client device 202(1).

In some examples, provisioning module 106 may help increase the probability of detecting rogue client devices by including a relatively high number of illegitimate authentication identifiers in a list that includes both legitimate and illegitimate authentication identifiers. For example, provisioning module 106 may configure the list such that the list includes more illegitimate authentication identifiers than legitimate authentication identifiers. By ensuring that the list includes more illegitimate authentication identifiers than legitimate authentication identifiers, provisioning module 106 may increase the probability that client device 202(1) selects an illegitimate authentication identifier from the list when requesting authentication via wireless hotspot 210.

In some examples, provisioning module 106 may publish illegitimate authentication identifier 112 in a beacon frame obtained by client device 202(1) via wireless hotspot 210. For example, provisioning module 106 may direct access point 206(1) to transmit a beacon frame that contains the list that includes the legitimate and illegitimate authentication identifiers. In this example, client device 202(1) may detect the beacon frame transmitted by access point 206(1) and then obtain the list from the beacon frame.

The phrase "beacon frame," as used herein, generally refers to any type or form of electronic communication and/or publication periodically transmitted by an access point. In one example, the beacon frame may correspond to the beacon specifications defined by IEEE 802.11. The beacon frame may effectively announce the presence of wireless hotspot 210 to client devices 202(1)-(N) that are located within range of wireless hotspot 210.

In some examples, provisioning module 106 may inject illegitimate authentication identifier 112 into network traffic at wireless hotspot 210 to enable client device 202(1) to detect illegitimate authentication identifier 112 in the network traffic. For example, provisioning module 106 may direct access device 206(1) to inject a fake GAS query into the network traffic at wireless hotspot 210. Provisioning module 106 may then direct access device 206(1) to inject a fake response to the fake GAS query into the network traffic at wireless hotspot 210. This fake response to the fake GAS query may contain list of illegitimate authentication identifiers 400 and/or list of illegitimate authentication identifiers 402.

In one example, a rogue client device, such as client device 202(1), may monitor the network traffic at wireless hotspot 210 in an attempt to identify and misappropriate an authentication identifier that facilitates authentication with one or more of external networks 212(1)-(N) via hotspot 210. While monitoring the network traffic at wireless hotspot 210, client device 202(1) may detect the fake response injected by access point 206(1). Client device 202(1) may then parse the fake response in search of one or more authentication identifiers that facilitate authentication with one or more of external networks 212(1)-(N). Upon parsing the fake response, client device 202(1) may identify list of illegitimate authentication identifiers 400 and/or list of illegitimate authentication identifiers 402 in the fake response.

Returning to FIG. 3, at step 306 one or more of the systems described herein may receive an authentication request from a client device to authenticate the client device with at least one external network via the wireless hotspot. For example, at step 306 reception module 108 may, as part of access point 206(1) in FIG. 2, receive authentication request 114 from client device 202(1). In this example, authentication request 114 may request that access point 206(1) authenticate client device 202(1) with at least one external network via wireless hotspot 210.

The systems described herein may perform step 306 in a variety of ways. In some examples, reception module 108 may monitor at least one communication channel of access point 206(1) for any authentication requests issued by client devices 202(1)-(N). While monitoring the communication channel of access point 206(1), reception module 108 may detect authentication request 114 issued by client device 202(1). As shown in FIG. 5, authentication request 114 may identify the purpose of the request (in this example, "Authentication with External Network"), the OUI selected by the requesting device (in this example "0x 51 6F 9B"), and the MAC address of the requesting device (in this example, "F0-DE-A1-69-B1-79").

Returning to FIG. 3, at step 308 one or more of the systems described herein may determine that the authentication request includes the illegitimate authentication identifier. For example, at step 308 determination module 110 may, as part of access point 206(1) in FIG. 2, determine that authentication request 114 includes illegitimate authentication identifier 112. As will be described in greater detail below, the inclusion of illegitimate authentication identifier 112 in authentication request 114 may indicate that client device 202(1) is a rogue device that is not authorized to use wireless hotspot 210.

The systems described herein may perform step 308 in a variety of ways. In some examples, determination module 110 may identify rogue client devices based on a variety of factors in addition to or instead of illegitimate authentication identifier 112. In one example, determination module 110 may identify the MAC address of the requesting device in authentication request 114. For example, determination module 110 may identify the "F0-DE-A1-69-B1-79" MAC address in authentication request 114 in FIG. 5. Determination module 110 may then determine that the "F0-DE-A1-69-B1-79" MAC address identified in authentication request 114 corresponds to client device 202(1).

In some examples, determination module 110 may determine that authentication request 114 includes illegitimate authentication identifier 112 by parsing authentication request 114. For example, determination module 110 may parse authentication request 114 in FIG. 5 in search of one or more authentication identifiers. Upon parsing authentication request 114, determination module 110 may identify the "0x 51 6E 9B" OUI in authentication request 114 and compare the "0x 51 6E 9B" OUI identifier with list of illegitimate authentication identifiers 400 in FIG. 4. Determination module 110 may then determine that the "0x 51 6E 9B" OUI corresponds to illegitimate authentication identifier 112 based at least in part on this comparison.

In one example, determination module 110 may identify an NAI-type authentication identifier (not illustrated in FIG. 5) in the authentication request received from client device 202(1). For example, determination module 110 may identify "MCC=310, MNC=021" as the NAI-type authentication identifier in the authentication request received from client device 202(1). In this example, determination module 110 may compare the "MCC=310, MNC=021" realm code included in the NAI-type authentication identifier with list of illegitimate authentication identifiers 402 in FIG. 4. Determination module 110 may then determine that the "MCC=310, MNC=021" realm code is included in list 402 based at least in part on this comparison.

In some examples, determination module 110 may determine that authentication request 114 includes an illegitimate authentication identifier based at least in part on the MAC address of the requesting device. In one example, determination module 110 may be configured to assume and/or infer the illegitimacy of all authentication requests issued by client devices that received only illegitimate authentication identifiers via wireless hotspot 210. For example, determination module 110 may determine that wireless hotspot 210 provided only illegitimate authentication identifiers to client device 202(1) based at least in part on the "F0-DE-A1-69-B1-79" MAC address identified in authentication request 114. Determination module 110 may then assume and/or infer that authentication request 114 includes an illegitimate authentication identifier since wireless hotspot 210 has provided only illegitimate authentication identifiers to client device 202(1).

Returning to FIG. 3, at step 310 one or more of the systems described herein may determine that the client device is a rogue device based at least in part on the illegitimate authentication identifier being included in the authentication request. For example, at step 310 determination module 110 may, as part of access point 206(1) in FIG. 2, determine that client device 202(1) is a rogue device based at least in part on illegitimate authentication identifier 112 being included in authentication request 114. In this example, determination module 110 may make this determination based at least in part on the assumption that only a rogue device would issue an authentication request that includes an illegitimate authentication identifier.

The systems described herein may perform step 310 in a variety of ways. In one example, determination module 110 may be configured to assume and/or infer that all client devices that issue an authentication request that includes an illegitimate authentication identifier are rogue devices. For example, determination module 110 may assume and/or infer that client device 202(1) is a rogue device since client device 202(1) issued authentication request 114, which includes illegitimate authentication identifier 112. This assumption and/or inference may derive from the fact that a legitimate client device is unlikely and/or not expected to issue an authentication request that includes an illegitimate authentication identifier.

For example, a legitimate client device may maintain one or more legitimate authentication identifiers that correspond to the device's ISP. Upon receiving a list of authentication identifiers that allegedly facilitate authentication with the ISPs supported by wireless hotspot 210, the legitimate client device may search this list for at least one of the legitimate authentication identifiers corresponding to the device's ISP. In the event that the list includes at least one of the legitimate authentication identifiers that correspond to the device's ISP, the legitimate client device may select the legitimate authentication identifier and issue an authentication request that includes the selected authentication identifier. The legitimate client device may then transmit this authentication request to access point 206(1) in an attempt to facilitate authentication with the device's ISP and gain legitimate access to the Internet via the wireless hotspot.

In the event that the list does not include any of the legitimate authentication identifiers that correspond to the device's ISP, the legitimate client device may query access point 206(1) for an additional list of authentication identifiers that facilitate authentication with the ISPs supported by wireless hotspot 210. Examples of such a query include, without limitation, GAS queries, ANQP queries, Wi-Fi queries, combinations of one or more of the same, or any other suitable query.

Accordingly, the legitimate client device may postpone issuing an authentication request until receiving the additional list and identifying at least one of the legitimate authentication identifiers that correspond to the device's ISP in the additional list. Since, in these examples, the legitimate client device selects only legitimate authentication identifiers that correspond to the device's ISP for inclusion in the authentication request, the legitimate client device would be unlikely to issue an authentication request that includes an illegitimate authentication identifier received from access point 206(1).

In some examples, maintenance module 104 may mark the MAC address of client device 202(1) to indicate that the MAC address corresponds to a rogue device. For example, maintenance module 104 may maintain a record that identifies the MAC addresses of known rogue devices. Maintenance module 104 may add the "F0-DE-A1-69-B1-79" MAC address to this record to indicate that client device 202(1) is a known rogue device. By adding the "F0-DE-A1-69-B1-79" MAC address to the record, maintenance module 104 may enable access point 206(1) to simply ignore any additional communications and/or requests from client device 202(1).

In some examples, maintenance module 104 may notify one or more other access points that the "F0-DE-A1-69-B1-79" MAC address corresponds to a rogue device. For example, maintenance module 104 may direct access point 206(1) to transmit a wireless communication that includes the "F0-DE-A1-69-B1-79" MAC address to access point 206(N). In this example, access point 206(N) may receive the wireless communication from access point 206(1) and then mark the "F0-DE-A1-69-B1-79" MAC address to indicate that the MAC address corresponds to a rogue device. By marking the "F0-DE-A1-69-B1-79" MAC address in this way, access point 206(N) may be able to ignore any communications and/or requests from client device 202(1) even though access point 206(N) did not provide any illegitimate authentication identifiers to client device 202(1).

In some examples, access point 206(1) may refuse to satisfy authentication request 114 issued by client device 202(1) in response to the determination that client device 202(1) is a rogue device. For example, access point 206(1) may simply ignore authentication request 114 by refusing to initiate the process of authenticating client device 202(1) with any of external networks 212(1)-(N). Additionally or alternatively, access point 206(1) may drop client device 202(1) from wireless hotspot 210.

In some examples, access point 206(1) may maintain interaction with client device 202(1) without satisfying authentication request 114. For example, access point 206(1) may assign a Virtual Local Area Network (VLAN) to client device 202(1) at wireless hotspot 210. In this example, access point 206(1) may enable the VLAN to handle the network traffic of client device 202(1) at wireless hotspot 210.

The VLAN may detect and/or capture the network traffic of client device 202(1). The VLAN may then forward this network traffic of client device 202(1) to a security server (not illustrated in FIG. 2). This security server may record the network traffic of client device 202(1) and/or respond to the network traffic (by, e.g., handling one or more requests issued by client device 202(1)). By responding to the network traffic of client device 202(1), the security server may keep client device 202(1) engaged and/or prevent client device 202(1)

from launching an attack that disrupts and/or impairs the Internet access provided by wireless hotspot 210.

Additionally or alternatively, the security server may analyze the network traffic for potential threats imposed by client device 202(1). For example, the security server may search the network traffic for evidence of potentially malicious behavior. During this search of the network traffic, the security server may detect one or more data packets indicating that client device 202(1) intends to launch a denial-of-service attack and/or a duration attack to disrupt and/or impair the Internet access provided by wireless hotspot 210.

The phrase "denial-of-service attack," as used herein, generally refers to any type or form of attempt to consume at least one computing and/or networking resource such that the resource is unavailable to legitimate client devices. The phrase "duration attack," as used herein, generally refers to any type or form of attempt to impede Internet access at a wireless hotspot by transmitting at least one data packet that specifies an unnecessarily prolonged duration to the wireless hotspot.

Upon detecting the data packets indicating that client device 202(1) intends to launch such an attack, the security server may confirm that client device 202(1) is a rogue device. Additionally or alternatively, the security server may direct access device 206(1) to mitigate the threat of attack by dropping client device 202(1) from wireless hotspot 210.

As explained above in connection with exemplary method 300 in FIG. 3, an access point of a wireless hotspot may detect rogue client devices attempting to gain illegitimate access to the Internet via the wireless hotspot. For example, an operator of a wireless hotspot may allow users of different ISPs to access the Internet via the wireless hotspot in accordance with roaming agreements established between the operator and the ISPs. Through these roaming agreements, the ISPs may offload a portion of the network traffic from their data networks to the wireless hotspot to help alleviate the load placed on their data networks.

In an effort to detect rogue client devices attempting to gain illegitimate access to the Internet via the wireless hotspot, an access point of the wireless hotspot may randomly generate illegitimate OUIs and/or realm codes that appear to rogue client devices to facilitate authentication with these ISPs. The access point may provide these illegitimate OUIs and/or realm codes to a client device attempting to gain Internet access via the wireless hotspot for the first time. By providing these illegitimate OUIs and/or realm codes to the client device, the access point may coax the client device into issuing an illegitimate authentication request indicative of a rogue device.

For example, upon receiving the illegitimate OUIs and/or realm codes from the access point, the client device may select one of the illegitimate OUIs and/or realm codes and issue an authentication request that includes the selected illegitimate OUI and/or realm code. The client device may then transmit this authentication request to the access point in an attempt to launch an attack on the wireless hotspot and/or gain illegitimate access to the Internet via the wireless hotspot.

Upon receiving the authentication request from the client device, the access point may identify the illegitimate OUI and/or realm name included in the authentication request. The access point may then determine that the client device is a rogue device since the authentication request received from the client device includes one of the illegitimate OUIs and/or realm codes. The access point may make this determination based at least in part on the assumption that only a rogue device would issue an illegitimate authentication request that includes one of the illegitimate OUIs and/or realm codes.

Figure 6:
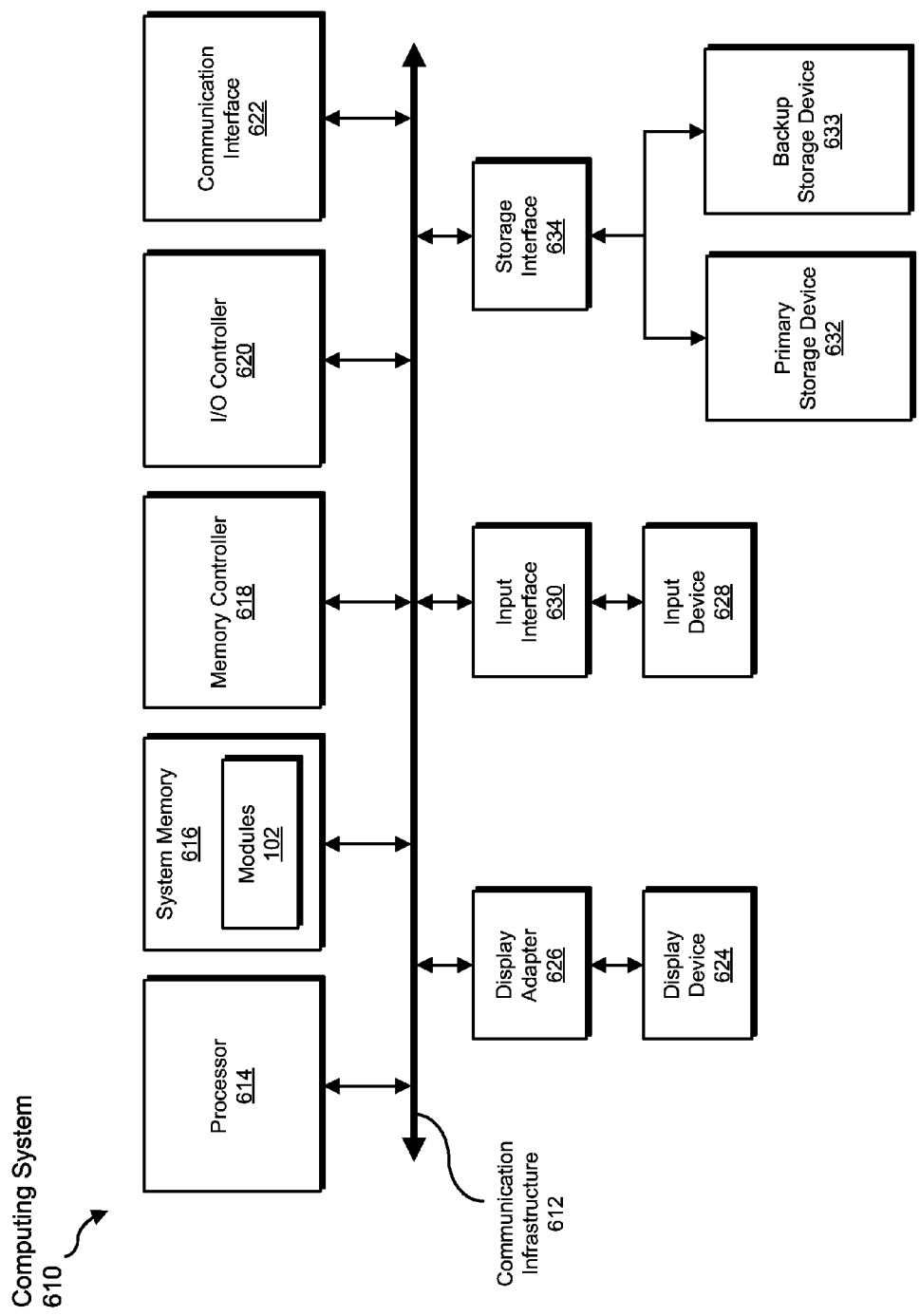
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
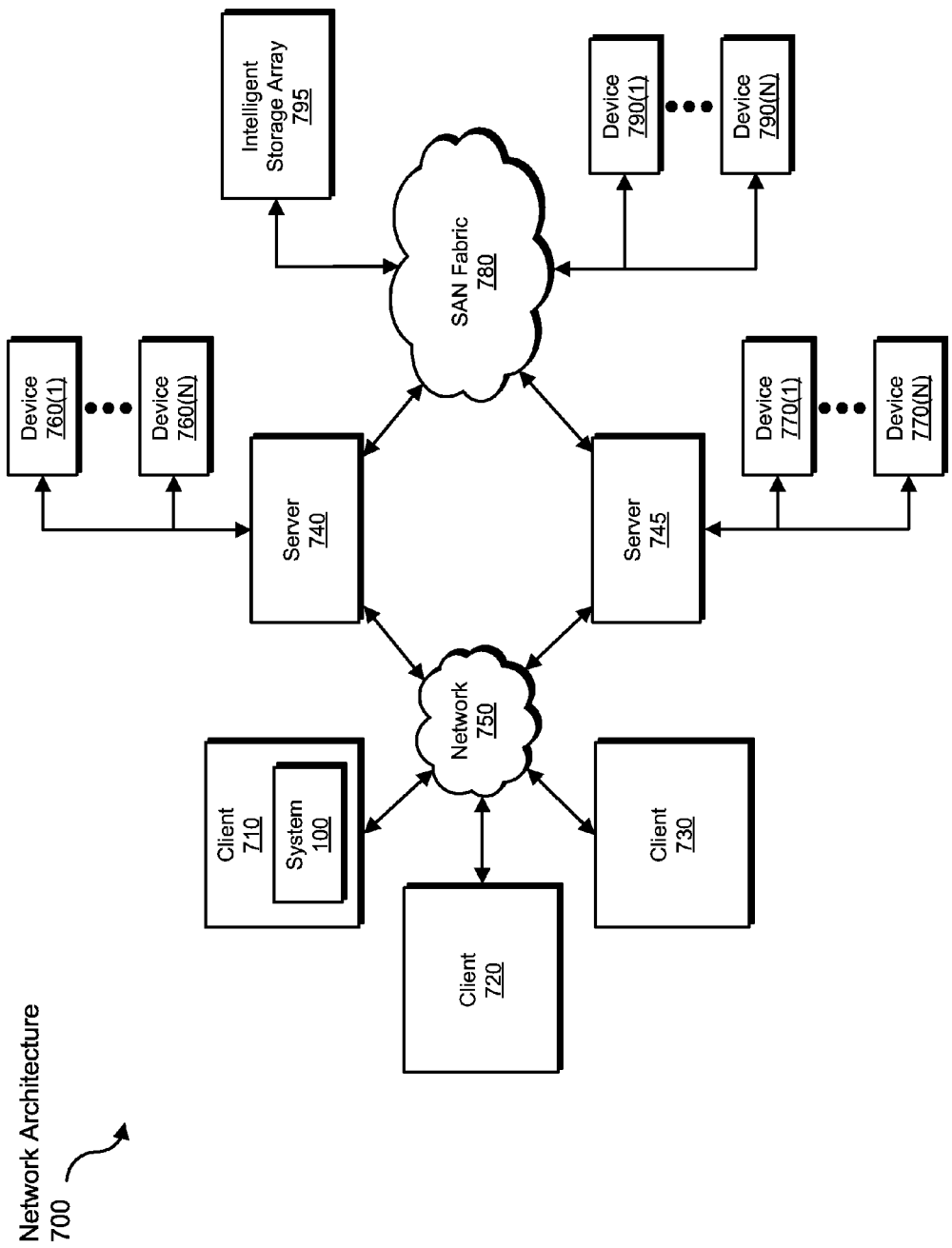
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for detecting rogue client devices connected to wireless hotspots.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive data from a client device, transform the data, output a result of the transformation to facilitate determining that the client device is a rogue device, use the result of the transformation to drop the client device from a wireless hotspot, and store the result of the transformation to facilitate ignoring additional communications and/or requests from the client device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting rogue client devices connected to wireless hotspots, at least a portion of the method being performed by a computing device comprising at least one processor, the method comprising:

identifying, at a legitimate wireless hotspot, a media access control address of a client device in a query for authentication identifiers;

determining, based at least in part on the media access control address of the client device, that the legitimate wireless hotspot has not previously encountered the client device;

in response to determining that the legitimate wireless hotspot has not previously encountered the client device, generating, at the legitimate wireless hotspot, at least one fake authentication identifier that appears to rogue client devices to facilitate authentication with an external network via the legitimate wireless hotspot;

maintaining, at the wireless hotspot, the fake authentication identifier;

providing, by the legitimate wireless hotspot, the fake authentication identifier to one or more client devices connected to the legitimate wireless hotspot in an attempt to coax any rogue client devices into exposing themselves by issuing authentication requests that include the fake authentication identifier;

receiving, from the client device, an authentication request to authenticate the client device with at least one external network via the legitimate wireless hotspot;

upon receiving the authentication request from the client device:
- determining that the authentication request includes the fake authentication identifier, and
- determining, based at least in part on the fake authentication identifier being included in the authentication request, that the client device is a rogue device that is not authorized to use the legitimate wireless hotspot.

2. The method of claim 1, wherein the query for authentication identifiers comprises a query for authentication identifiers that facilitate authentication with at least one external network via the legitimate wireless hotspot;
wherein providing the fake authentication identifier to the client devices connected to the legitimate wireless hotspot comprises providing the fake authentication identifier to the client device in response to the query.

3. The method of claim 1, wherein generating the fake authentication identifier comprises:
determining that at least one trigger associated with the legitimate wireless hotspot exceeds a predetermined threshold, wherein the trigger comprises at least one of:
- a specific number of queries received by the legitimate wireless hotspot,
- a specific number of authentication requests received by the legitimate wireless hotspot,
- a specific number of client devices that have been successfully authenticated with the external network via the legitimate wireless hotspot, and
- a specific number of failed authentication requests received by the legitimate wireless hotspot;

generating the fake authentication identifier in response to determining that the trigger exceeds the predetermined threshold.

4. The method of claim 1, wherein determining that the authentication request includes the fake authentication identifier comprises:
identifying, in the authentication request, the media access control address of the client device that was not previously encountered by the legitimate wireless hotspot;
determining, based at least in part on the media access control address of the client device, that the legitimate wireless hotspot provided only the fake authentication identifier to the client device;
determining, based at least in part on the legitimate wireless hotspot having provided only the fake authentication identifier to the client device, that the authentication request includes the fake authentication identifier.

5. The method of claim 1, wherein providing the fake authentication identifier to the client devices connected to the legitimate wireless hotspot comprises:
compiling a list of authentication identifiers that includes:
- the fake authentication identifier;
- at least one legitimate authentication identifier that facilitates authentication with an external network via the legitimate wireless hotspot;

providing the list of authentication identifiers to the client device.

6. The method of claim 1, wherein providing the fake authentication identifier to the client devices connected to the legitimate wireless hotspot comprises publishing the fake authentication identifier in a beacon frame obtained by the client device.

7. The method of claim 1, wherein providing the fake authentication identifier to the client devices connected to the legitimate wireless hotspot comprises injecting the fake authentication identifier into network traffic at the legitimate wireless hotspot to enable the client device to detect the fake authentication identifier in the network traffic at the legitimate wireless hotspot.

8. The method of claim 1, wherein determining that the authentication request includes the fake authentication identifier comprises:
parsing the authentication request received from the client device;
upon parsing the authentication request, identifying the fake authentication identifier in the authentication request.

9. The method of claim 1, wherein determining that the client device is a rogue device comprises marking, at an access point of the legitimate wireless hotspot, a media access control address of the client device to indicate that the media access control address corresponds to a rogue device.

10. The method of claim 9, wherein marking the media access control address of the client device at the legitimate wireless hotspot comprises notifying at least one other access point of the legitimate wireless hotspot that the media access control address corresponds to a rogue device.

11. The method of claim 1, further comprising, in response to determining that the client device is a rogue device:
maintaining interaction with the client device without satisfying the authentication request by:
- assigning a virtual local area network to the client device at the legitimate wireless hotspot;
- enabling the virtual local area network to handle network traffic of the client device at the legitimate wireless hotspot;

analyzing the network traffic of the client device handled by the virtual local area network;
detecting at least one threat imposed by the client device based at least in part on analyzing the network traffic of the client device;
mitigating the threat imposed by the client device in response to detecting the threat.

12. The method of claim 1, wherein the fake authentication identifier comprises at least one of:
- a randomly generated organizationally unique identifier that does not facilitate authentication with an external network via the legitimate wireless hotspot;
- a randomly generated realm name that does not facilitate authentication with an external network via the legitimate wireless hotspot.

13. A system for detecting rogue client devices connected to wireless hotspots, the system comprising:
a determination module that:
- identifies, at a legitimate wireless hotspot, a media access control address of a client device in a query for authentication identifiers;
- determines, based at least in part on the media access control address of the client device, that the legitimate wireless hotspot has not previously encountered the client device;

a maintenance module that:
- generates, at the legitimate wireless hotspot, at least one fake authentication identifier that appears to rogue client devices to facilitate authentication with an external network via the legitimate wireless hotspot in response to the determination that the legitimate wireless hotspot has not previously encountered the client device;

maintains, at the wireless hotspot, the fake authentication identifier;
a provisioning module that provides, from the legitimate wireless hotspot, the fake authentication identifier to one or more client devices connected to the legitimate wireless hotspot in an attempt to coax any rogue client devices into exposing themselves by issuing authentication requests that include the fake authentication identifier;
a reception module that receives, from the client device, an authentication request to authenticate the client device with at least one external network via the legitimate wireless hotspot;
wherein the determination module further
determines that the authentication request includes the fake authentication identifier, and
determines, based at least in part on the fake authentication identifier being included in the authentication request, that the client device is a rogue device that is not authorized to use the legitimate wireless hotspot;
at least one physical processor configured to execute the maintenance module, the provisioning module, the reception module, and the determination module.

14. The system of claim 13, wherein:
the query for authentication identifiers comprises a query for authentication identifiers that facilitate authentication with at least one external network via the legitimate wireless hotspot;
the provisioning module further provides the fake authentication identifier to the client device in response to the query.

15. The system of claim 13, wherein the determination module further:
identifies, in the authentication request, the media access control address of the client device that was not previously encountered by the legitimate wireless hotspot;
determines, based at least in part on the media access control address of the client device, that the legitimate wireless hotspot provided only the fake authentication identifier to the client device;
determines, based at least in part on the legitimate wireless hotspot having provided only the fake authentication identifier to the client device, that the authentication request includes the fake authentication identifier.

16. The system of claim 13, wherein the provisioning module further:
compiles a list of authentication identifiers that includes:
the fake authentication identifier;
at least one legitimate authentication identifier that facilitates authentication with an external network via the legitimate wireless hotspot;
provides the list of authentication identifiers to the client device.

17. The system of claim 13, wherein the fake authentication identifier comprises at least one of:
a randomly generated organizationally unique identifier that does not facilitate authentication with an external network via the legitimate wireless hotspot;
a randomly generated realm name that does not facilitate authentication with an external network via the legitimate wireless hotspot.

18. A non-transitory computer-readable-storage medium comprising one or more computer-executable instructions that, when executed by at least one processor of a computing device, cause the computing device to:
identify, at a legitimate wireless hotspot, a media access control address of a client device in a query for authentication identifiers;
determine, based at least in part on the media access control address of the client device, that the legitimate wireless hotspot has not previously encountered the client device;
generate, at the legitimate wireless hotspot, at least one fake authentication identifier that appears to rogue client devices to facilitate authentication with an external network via the legitimate wireless hotspot in response to the determination that the legitimate wireless hotspot has not previously encountered the client device;
maintain, at the legitimate wireless hotspot, the fake authentication identifier;
provide, by the legitimate wireless hotspot, the fake authentication identifier to one or more client devices connected to the legitimate wireless hotspot in an attempt to coax any rogue client devices into exposing themselves by issuing authentication requests that include the fake authentication identifier;
receive, from the client device, an authentication request to authenticate the client device with at least one external network via the legitimate wireless hotspot;
upon receiving the authentication request from the client device:
determine that the authentication request includes the fake authentication identifier, and
determine, based at least in part on the fake authentication identifier being included in the authentication request, that the client device is a rogue device that is not authorized to use the legitimate wireless hotspot.

* * * * *